No. 846,288. PATENTED MAR. 5, 1907.
V. C. DRIFFIELD & F. W. WRIGHT.
PURIFICATION OF SULFURIC ACID.
APPLICATION FILED MAR. 21, 1906.
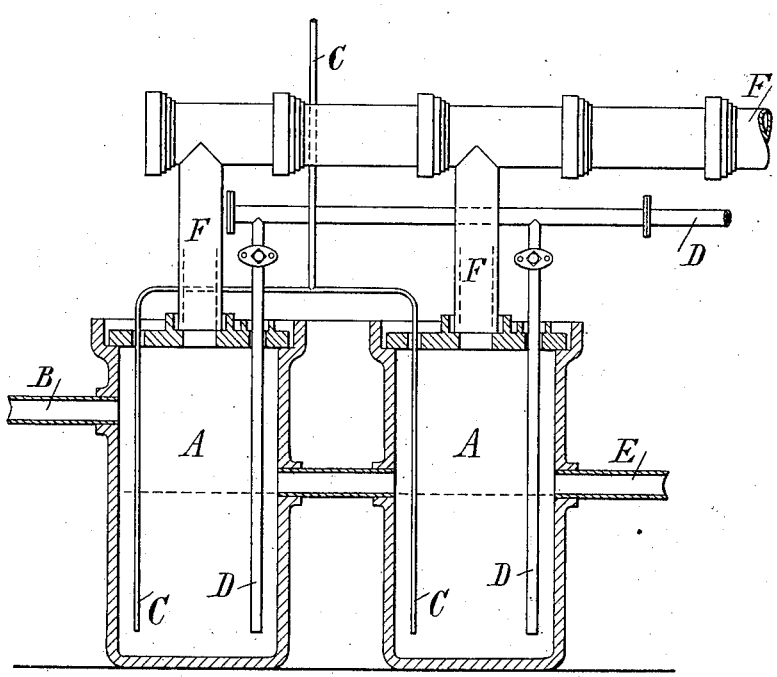

UNITED STATES PATENT OFFICE.

VERO CHARLES DRIFFIELD AND FREDERICK WILLIAM WRIGHT, OF LIVERPOOL, ENGLAND, ASSIGNORS TO THE UNITED ALKALI COMPANY LIMITED, OF LIVERPOOL, ENGLAND.

PURIFICATION OF SULFURIC ACID.

No. 846,288.      Specification of Letters Patent.      Patented March 5, 1907.

Application filed March 21, 1906. Serial No. 307,187.

*To all whom it may concern:*

Be it known that we, VERO CHARLES DRIFFIELD, a subject of the King of Great Britain and Ireland, works manager, and FREDERICK WILLIAM WRIGHT, a subject of the King of Great Britain and Ireland, chemist, both residing at 30 James street, Liverpool, in the county of Lancaster, England, have invented certain new and useful Improvements in the Purification of Sulfuric Acid, of which the following is a specification.

The object of this invention is to effect in a ready, economical, and satisfactory manner the purification of sulfuric acid from arsenic. This is effected according to this invention by the addition of hydrochloric acid or a suitable chlorid, such as sodium chlorid, to the sulfuric acid to be purified and blowing air through. We will presume that hydrochloric acid is to be used. The sulfuric acid may be hot or cold during treatment, since the process may be successfully carried out under a range of temperature varying from 15° centigrade to 200° centigrade, the best results being obtained between 90° centigrade and 150° centigrade. The amount of hydrochloric acid added is in accordance with the amount of arsenic present and the degree of purity desired. The hydrochloric acid may be either in liquid or it may be in gaseous form, and it may be added in successive amounts. The air may be blown through either during the addition of the hydrochloric acid or afterward, as we do not limit ourselves to any precise procedure.

The accompanying drawing represents an example of an apparatus suitable for treating the arsenical sulfuric acid with liquid hydrochloric acid; but we do not limit ourselves to this apparatus.

A A represent two earthenware vessels into which the sulfuric acid is admitted by the pipe B, and in its passage through these vessels it meets the liquid hydrochloric acid which is admitted by the pipes C, air being simultaneously blown through the mixture of acids by the pipes D. The dearsenicated sulfuric acid escapes by the pipe E, while the arsenious chlorid and residual hydrochloric acid escape by the pipes F; or the sulfuric acid can be treated in a series of receptacles through which it successively passes, the hydrochloric acid and air being added to the first of the series, or the air can be blown into the leading receptacle of the series and the hydrochloric acid be passed into the second receptacle, the sulfuric acid passing in the reverse direction. As aforesaid, a suitable chlorid, such as sodium chlorid, can be used instead of hydrochloric acid. The foregoing presumes that the arsenic is in the arsenious state. If it be present in the arsenic state, a reducing agent (such as sulfurous anhydrid, for example) is introduced.

The arsenious chlorid which is evolved can be treated in any suitable manner for the obtainment of arsenic compounds.

Having now particularly described and ascertained the nature of our said invention and in what manner the same is to be performed, we declare that what we claim is—

1. The process of purifying sulfuric acid from arsenic, consisting in treating at a temperature preferably between 90° centigrade and 150° centigrade, the sulfuric acid with an agent capable of transforming the arsenic present in the arsenious state into arsenious chlorid, and blowing air through the mixture, substantially as described.

2. The process of purifying sulfuric acid from arsenic, consisting in treating at a temperature preferably between 90° centigrade and 150° centigrade the sulfuric acid with hydrochloric acid and blowing air through the mixture substantially as described.

3. The process of purifying sulfuric acid from arsenic consisting in treating the acid with an agent capable of reducing to the arsenious state the arsenic present in the arsenic state, treating at a temperature preferably between 90° centigrade and 150° centigrade with hydrochloric acid and blowing air through the mixture substantially as described.

4. The process of purifying sulfuric acid from arsenic, consisting in treating the sulfuric acid with sulfurous anhydrid, then treating at a temperature preferably between 90° centigrade and 150° centigrade with hydrochloric acid and blowing air through the mixture substantially as described.

In testimony whereof we have signed this specification in the presence of two subscribing witnesses.

VERO CHARLES DRIFFIELD.
   FREDERICK WILLIAM WRIGHT.

Witnesses:
 JAMES SHAW ASCROFT,
 A. V. JOHNSON.